US009298595B2

(12) United States Patent
Tuovinen et al.

(10) Patent No.: US 9,298,595 B2
(45) Date of Patent: Mar. 29, 2016

(54) EVALUATION OF RESIZING CAPABILITY OF WEB BROWSER

(71) Applicant: Rightware Oy, Espoo (FI)

(72) Inventors: Jouni Tuovinen, Helsinki (FI); Teemu Uotila, Espoo (FI)

(73) Assignee: Basemark Oy, Helsinki (FI)

( * ) Notice: Subject to any disclaimer, the term of this patent is extended or adjusted under 35 U.S.C. 154(b) by 560 days.

(21) Appl. No.: 13/668,405

(22) Filed: Nov. 5, 2012

(65) Prior Publication Data
US 2014/0129916 A1 May 8, 2014

(30) Foreign Application Priority Data

Nov. 4, 2012 (EP) ...................................... 12191184

(51) Int. Cl.
G06F 11/36 (2006.01)
(52) U.S. Cl.
CPC .................................. *G06F 11/3684* (2013.01)
(58) Field of Classification Search
None
See application file for complete search history.

(56) References Cited

U.S. PATENT DOCUMENTS

| 5,760,772 | A | * | 6/1998 | Austin | 715/798 |
| 8,296,643 | B1 | * | 10/2012 | Vasilik | 715/200 |
| 2004/0261037 | A1 | * | 12/2004 | Ording et al. | 715/788 |
| 2008/0079738 | A1 | * | 4/2008 | Chen | 345/520 |
| 2011/0055685 | A1 | * | 3/2011 | Jaquish et al. | 715/234 |
| 2011/0093773 | A1 | * | 4/2011 | Yee | 715/235 |
| 2011/0145759 | A1 | * | 6/2011 | Leffert et al. | 715/800 |
| 2011/0185317 | A1 | * | 7/2011 | Thimbleby et al. | 715/863 |
| 2011/0264996 | A1 | * | 10/2011 | Norris, III | 715/236 |
| 2012/0324359 | A1 | * | 12/2012 | Lee et al. | 715/733 |
| 2014/0085338 | A1 | * | 3/2014 | Chen et al. | 345/649 |
| 2014/0089904 | A1 | * | 3/2014 | Wray | 717/135 |

OTHER PUBLICATIONS

JavaScript Tutorial, "Coordinates", retrieved from http://web.archive.org/web/20111008011028/http://javascript.info/tutorial/co-ordinates.*
Shauvik Roy Choudhary et al: "WEBDIFF: Automated identification of cross-browser issues in web applications", Software Maintenance (ICSM), 2010 IEEE International Conference on, IEEE, Piscataway, NJ, USA, Sep. 12, 2010, XP031780809.

* cited by examiner

*Primary Examiner* — Stephen Hong
*Assistant Examiner* — Sanchita Roy
(74) *Attorney, Agent, or Firm* — Seppo Laine Oy

(57) ABSTRACT

A new method and computer program for evaluating page resizing of a web browser. A web page with a test area having test elements is created. Then, the web page is displayed by the web browser and locations of at least two original edge points for each of the test elements are determined. After this, the test area within the web page is resized and displayed with the resized test area. Then, a further determination step is performed for each resized test element in the displayed web page, whereby locations of at least two respective resized edge points of the test element are determined. After obtaining these locations, comparisons between the locations of the at least two original edge points and the locations of the at least two respective resized edge points are made.

13 Claims, 8 Drawing Sheets

EVALUATION OF RESIZING CAPABILITY OF WEB BROWSER

TECHNICAL FIELD

The invention relates to methods and computer programs for evaluating page resizing capability of a web browser.

BACKGROUND

Page resizing is needed for example when a user of the web browser enlarges or shrinks a web browser window on their terminal, for example a computer, laptop, tablet or smart phone. Currently, a typical web browser calculates the coordinates for the objects to be displayed based on relative size parameters and a reference point on a screen. These calculations based on relative parameters are prone to errors and inaccuracies due to different resolutions and varying aspect ratios of the displays, for instance.

In practice, most web users have noticed situations in which a certain elements of the displayed page are incorrectly located of apparently wrong size. This is particularly annoying when for example the user is prompted to enter information but, because of errors in resizing, it is difficult to find the box for entering the requested data. It can also happen that one of the elements is incorrectly displayed over another element thus hiding relevant information and preventing efficient use of the webpage. Actually, it is surprising how common these errors are even though web browsers are extremely widely used products, often developed by highly respected technology companies with huge resources. This allows a conclusion that there are some particular difficulties and problems in programming web browsers and there is still need for improvement.

SUMMARY OF THE INVENTION

It is an object of the present invention to facilitate development of web browser technology with regard to web browsers' resizing capabilities.

This object is achieved by creating a new method and computer program for evaluating page resizing capability of a web browser.

According to an aspect of the invention, there is provided a method of evaluating page resizing capability of a web browser by means of a computer program. The method comprises creating a web page with a test area, which test area comprises a plurality of test elements. Then, the web page is displayed by the web browser and a determination step is performed for each test element in the displayed web page. The determination step comprises determining locations of at least two original edge points of the test element. After this, the method comprises resizing the test area within the web page and displaying the web page with the resized test area. Then, a further determination step is performed for each resized test element in the displayed web page, whereby locations of at least two respective resize edge points of the test element are determined. Herein, the respective resize edge points refer to corresponding points in the test element than the determined original edge points. After obtaining these locations, the method comprises making comparisons between the locations of the at least two original edge points and the locations of the at least two respective resize edge points.

According to another aspect of the invention, there is provided an application program for evaluating page resizing capability of a web browser. The application program comprises program code means for instruction a user terminal to perform the method described above.

The invention allows several different useful embodiments.

For example, from the obtained data, it is possible to determine whether the web browser can do resizing correctly.

According to an embodiment, it is also possible to determine from the obtained data, what kind of errors the web browser in question makes in resizing of web pages.

The invention and its embodiments can be used, for example, for benchmarking web browsers and thus allow making comparisons between different web browser products. Such functionality has not been previously available.

According to an embodiment, the evaluation can be made by visiting a web page offering an appropriate application program. Then, it is easy also for ordinary consumers to run the test by clicking a corresponding button on the web page and thereby conveniently run the evaluation. This should increase awareness of the capabilities of different web browsers and consequently boost development of better products.

The invention and its embodiments can also be used by the developers of web browser for evaluating the resizing capabilities of their web browsers, which helps them in improving their products.

BRIEF DESCRIPTION OF DRAWINGS

For a more complete understanding of the present invention and the advantages thereof, the invention is now described with the aid of the examples and with reference to the following drawings, in which.

DETAILED DESCRIPTION OF EXEMPLARY EMBODIMENTS

Figure 1:
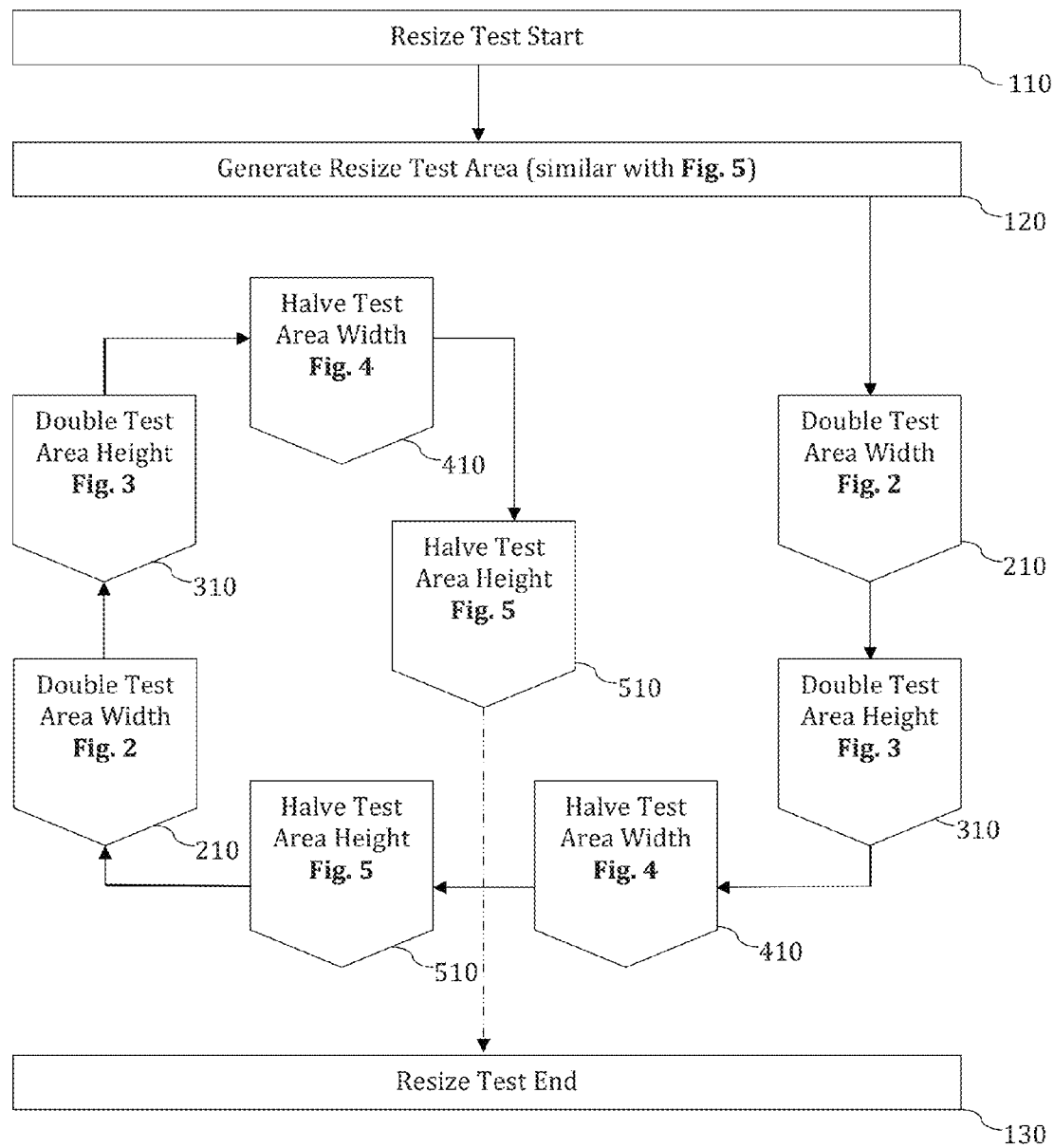
FIG. 1 shows a general process flow through different phases of resize according to an embodiment.

Various embodiments, one of which is called BROWSERMARK™, are discussed in the description below. BROWSERMARK™ is designed to benchmark browsers' performance capabilities in multiple ways. Resize testing can be a part of a more extensive testing suite.

As already discussed above, web browser's resizing capability is an important feature. It must work smoothly and scale all the displayed information relatively fast in order to guarantee smooth user experience.

BROWSERMARK™ is designed to benchmark browsers performance capabilities in multiple different ways, where resize testing is part of a more extensive testing suite. Resize benchmarking executed within BROWSERMARK™ product tests in different ways how current browsers operate when doing resize.

In the beginning of the test, a web page with a test area is created. The test area forms usually a portion of the displayed area of the web page. The test area displayed within the web page comprises a plurality of test elements which will be resized several times during the test. According to the embodiments, the number of test elements is at least three, preferably at least nine, and usually at least 27. In the embodiment discussed below with reference to the figures, the number of test elements is 54. In preferred embodiments, some of the test elements are located inside another test element such that there is a so-called static parent element and one or more dynamic child elements within the static parent element. The term "dynamic" refers to the fact that the location and dimensions of the child element are defined relative to its parent element whereas the term "static" means that there is no such relative relationship to a parent element but the location and size of the static element, be it a parent element or a child element, can be independently selected.

It is also possible, and even preferable, that there is least one further dynamic child element placed inside a child element. Then, this further child element inside a child element is called as a grand-child element, and the child element within which the grand-child element is placed is a direct parent of the grand-child element. In this case, the location and dimensions of the grand-child element are defined relative to its direct parent element, i.e. the child element, which on its part is defined in relation to the parent element. Such a construction with multiple elements defined with regard to other elements and having also serial relationships, allows building a powerful tool for evaluating web browser capabilities.

After the test has created individual elements within the test area, the test area is either shrunk or enlarged. In preferred embodiments, the test comprises performing consecutive resize operations, preferably with different parameters. This means that, for example, the test area is alternately enlarged and shrunk several times in sequence. The consecutive enlarge requests can also be mutually different such as, for example, a first request is to widen the area, the next request is to increase height and then to increase both height and width. In between of these requests, shrunk resize tasks can be performed in a correspondingly varied way. This is of course only an example of the various possibilities of constructing an effective test sequence. However, it is preferable that the test sequence comprises several serially performed resize steps with several different resize parameters. After each resize step, the modified area with its elements can be checked to verify the correctness of the relative locations of the elements.

Figure 8:
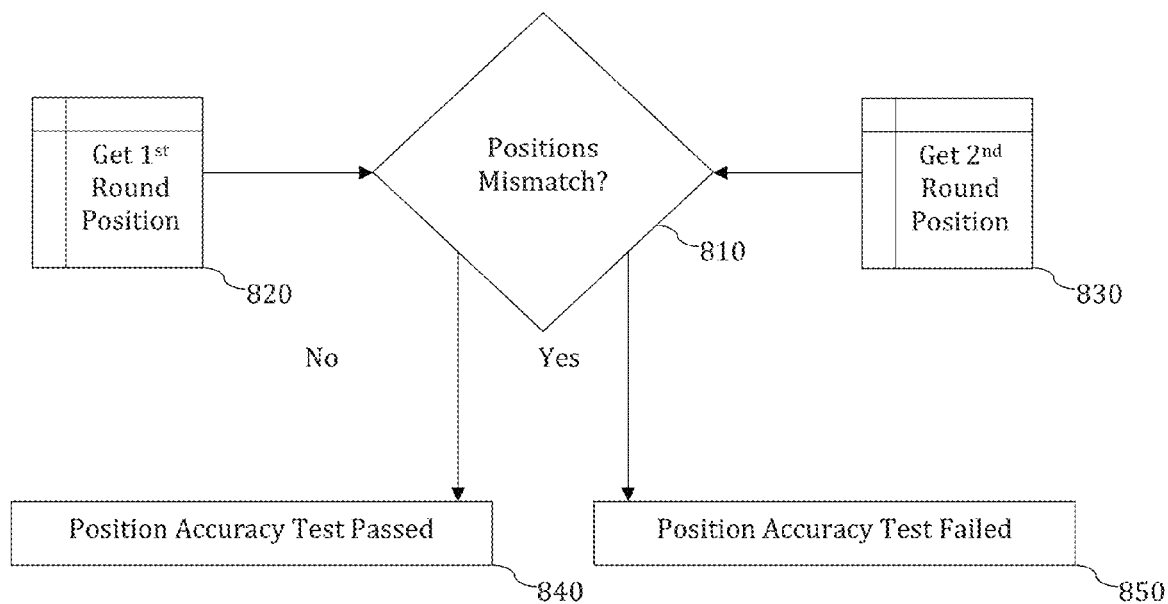
FIG. 8 shows an example of a sub-process relating to a position test according to an embodiment.

In an embodiment, the resize parameters are selected such that the resulting test area at the end of the test should be identical with the originally created original test area in the beginning of the test, if the web browser made all exactly and correctly. This allows making a check as to the accuracy of the whole resize process performed by the web browser, for example as shown in FIG. 8 discussed below.

FIG. 1 illustrates a general workflow of resizing sequence in off-page connectors. First, step 110 initiates the process and Resize testing starts. Of course, as already discussed above, the process of FIG. 1 is only one example of the various possible process designs. According to FIG. 1, after the test has been launched, BROWSERMARK™ generates resizing test area at step 120. Step 120 has similar functionality as described below with reference to FIG. 5. The general process according to the embodiment of FIG. 1 comprises a flow of steps from step 120 to step 210 wherein the test area width is doubled. Next, in step 310, the test area height is doubled and then, in step 410, the test area width is halved. Then the process continues to step 510, wherein the test area height is halved. After this, the process repeats the steps 210, 310, 410 and 510 as shown in FIG. 1. After repetition of the resize steps 210, 310, 410 and 510, the position accuracy test described in FIG. 8 (not shown in FIG. 1) is performed and thereafter the process moves to step 130 and ends the resize scenario.

Thus, the example process of FIG. 1 performs eight resize steps. Of course, the number of steps can be selected also otherwise and can be modified such that it is, for example, from six to twelve, these numbers however being not limiting but only suggest one range from which suitable values can be selected for many practical test purposes. It is also possible to change the order of the resize steps 210, 310, 410 and 510 or substitute one or more of the steps by a different kind of resize operation. And of course, different resize parameters can be selected, for example such that resize factors other than half and double are used. One can for example increase a dimension by 25% and then later decrease the dimension by 20%, or increase by 150% and decrease by 60%. Alternatively, a dimension can first be decreased and then later increased, or any suitable other combination of appropriate steps can be used.

Figure 2:
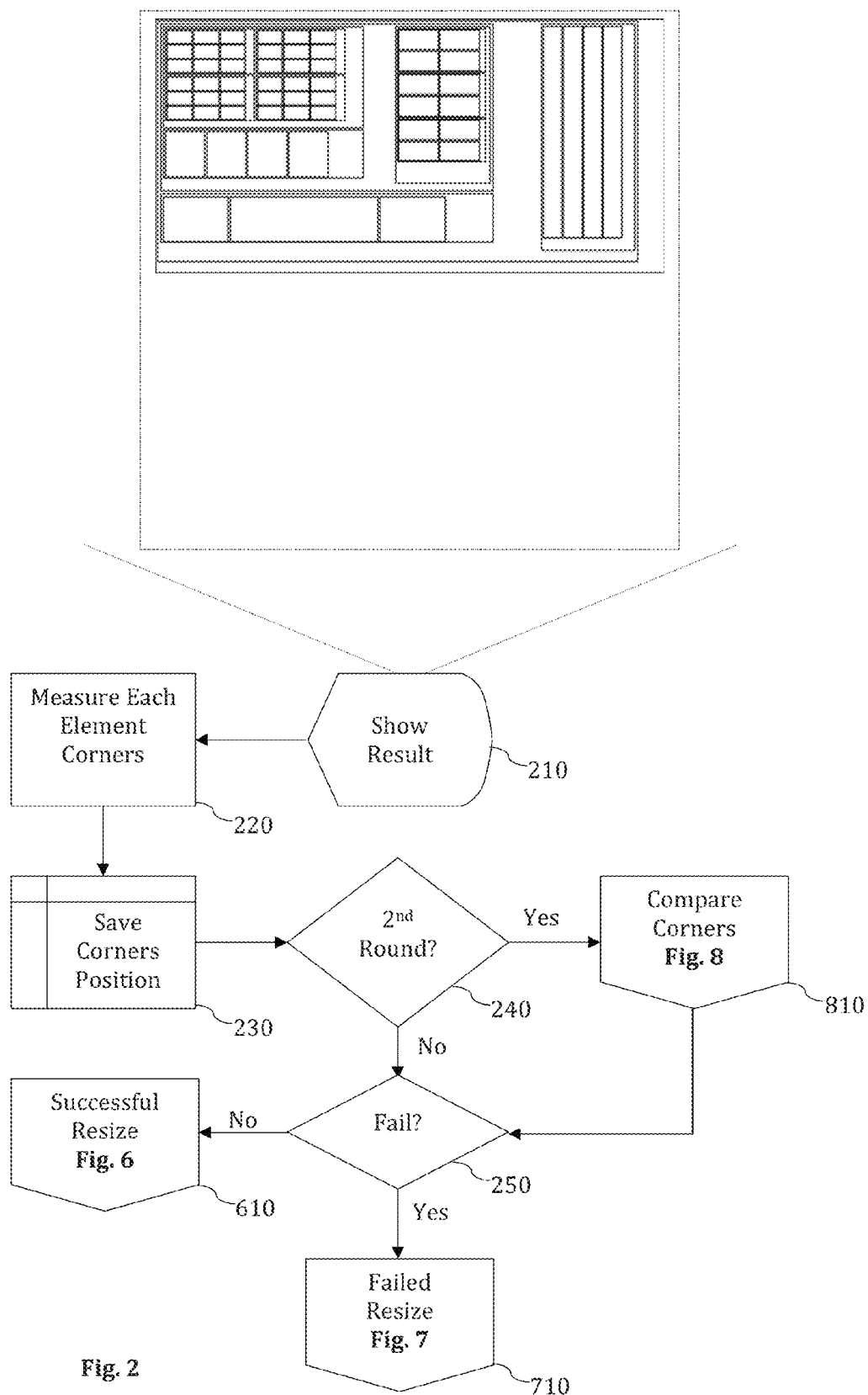
FIG. 2 shows an example of a sub-process that can be used in the general process of FIG. 1 in accordance with an embodiment.

FIG. 2 shows a sub-process performed after the resize results are displayed after execution of double test area width step 210. Then step 220 measures or determines locations of at least two diagonal corners from each element and step 230 stores the data in its internal storage for later reference. After storing the information, a decision is made at step 240 as to how to continue. If this was the first round and a second round is still needed, the application then exits the sub-process and moves forward according to the main process of FIG. 1. If this is the second round, the sub-process continues to step 810, described in more detailed level in FIG. 8, and after that to step 250, where a decision is made whether the resize was successful. Box 610 refers to FIG. 6, which shows an example of a successful resize, whereas box 710 referring to FIG. 7 shows an example of a resize failure. Just to give an example, the displayed primary element width can be 1 000 pixels and height 500 pixels, for instance.

Figure 3:
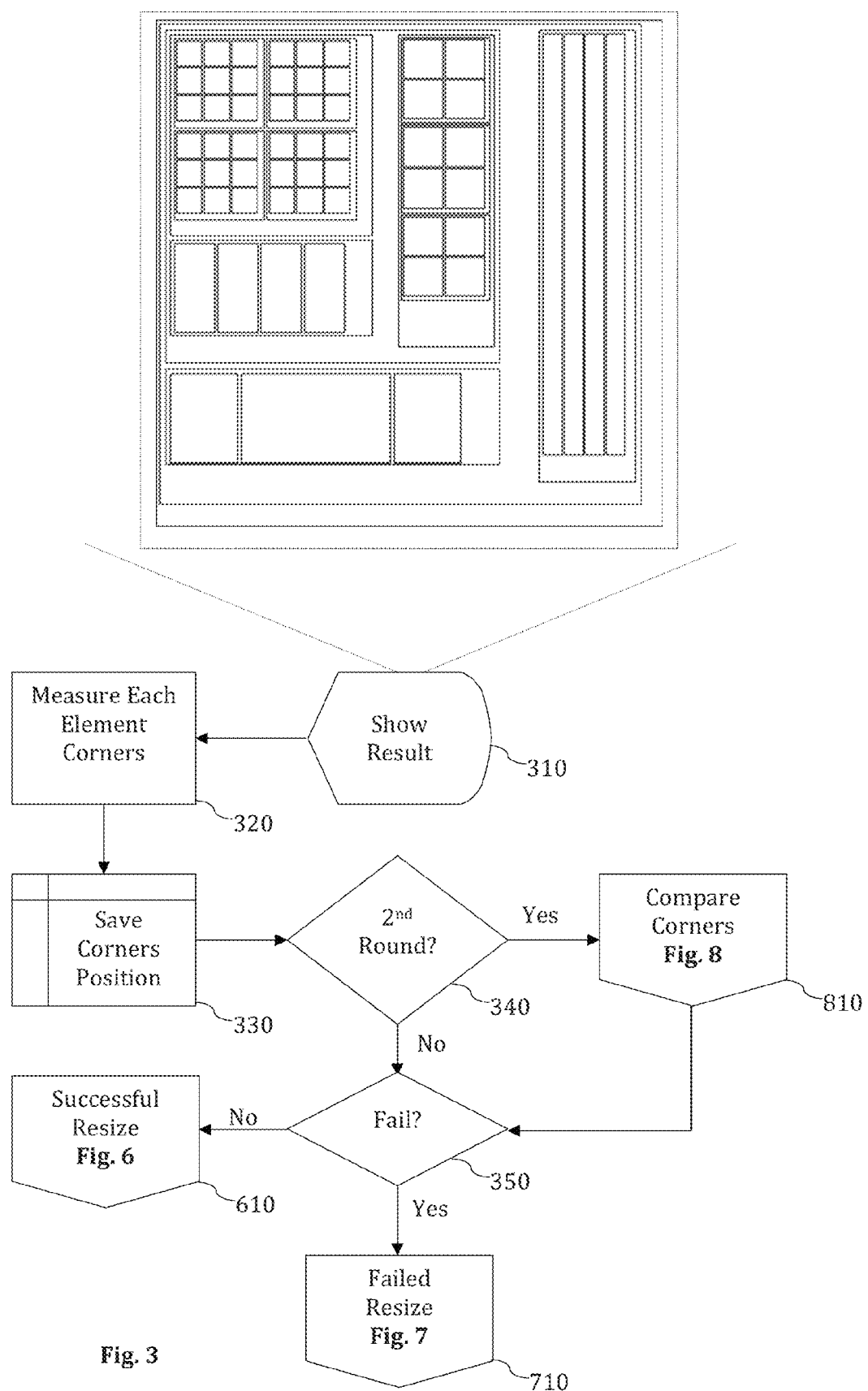
FIG. 3 shows a second example of a sub-process that can be used in the process of FIG. 1 in accordance with an embodiment.

FIG. 3 shows a sub-process performed after the resize results are displayed after execution of double test area height step 310. Then step 320 measures or determines locations of at least two diagonal corners from each element and step 330 stores the data in its internal storage for later reference. After storing the information, a decision is made at step 340 as to how to continue. If this was the first round and a second round is still needed, the application then exits the sub-process and moves forward according to the main process of FIG. 1. If this is the second round, the sub-process continues to step 810, described in more detailed level in FIG. 8, and after that to step 350, where a decision is made whether the resize was successful. Box 610 refers to FIG. 6, which shows an example of a successful resize, whereas box 710 referring to FIG. 7 shows an example of a resize failure. Just to give an example, the displayed primary element width can be 1 000 pixels and height 1 000 pixels, for instance.

Figure 4:
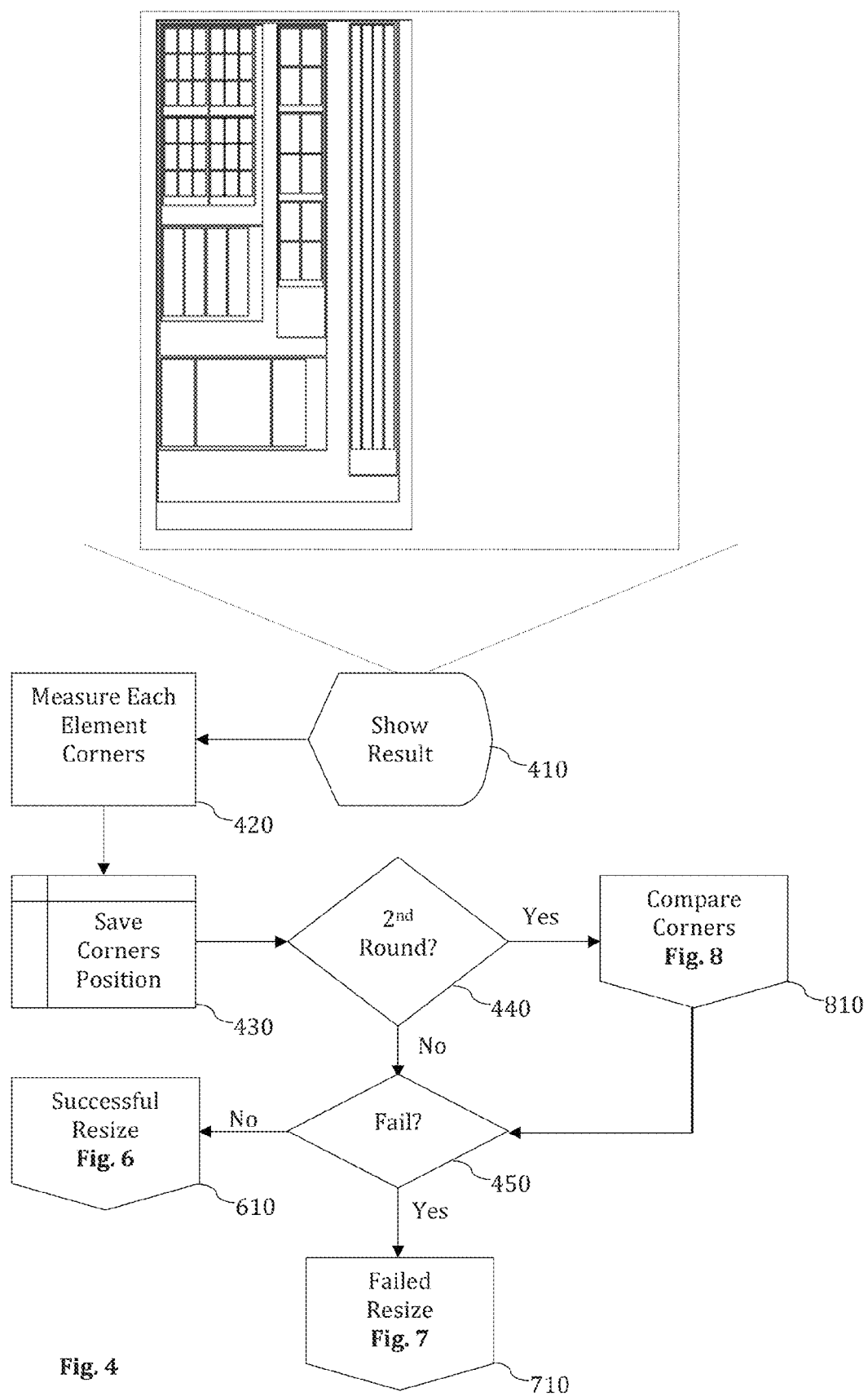
FIG. 4 shows a third example of a sub-process that can be used in the process of FIG. 1 in accordance with an embodiment.

FIG. 4 shows a sub-process performed after the resize results are displayed after execution of halve test area width step 410. Then step 420 measures or determines locations of at least two diagonal corners from each element and step 430 stores the data in its internal storage for later reference. After storing the information, a decision is made at step 440 as to how to continue. If this was the first round and a second round is still needed, the application then exits the sub-process and moves forward according to the main process of FIG. 1. If this is the second round, the sub-process continues to step 810, described in more detailed level in FIG. 8, and after that to step 450, where a decision is made whether the resize was successful. Box 610 refers to FIG. 6, which shows an example of a successful resize, whereas box 710 referring to FIG. 7 shows an example of a resize failure. Just to give an example, the displayed primary element width can be 500 pixels and height 1 000 pixels, for instance.

Figure 5:
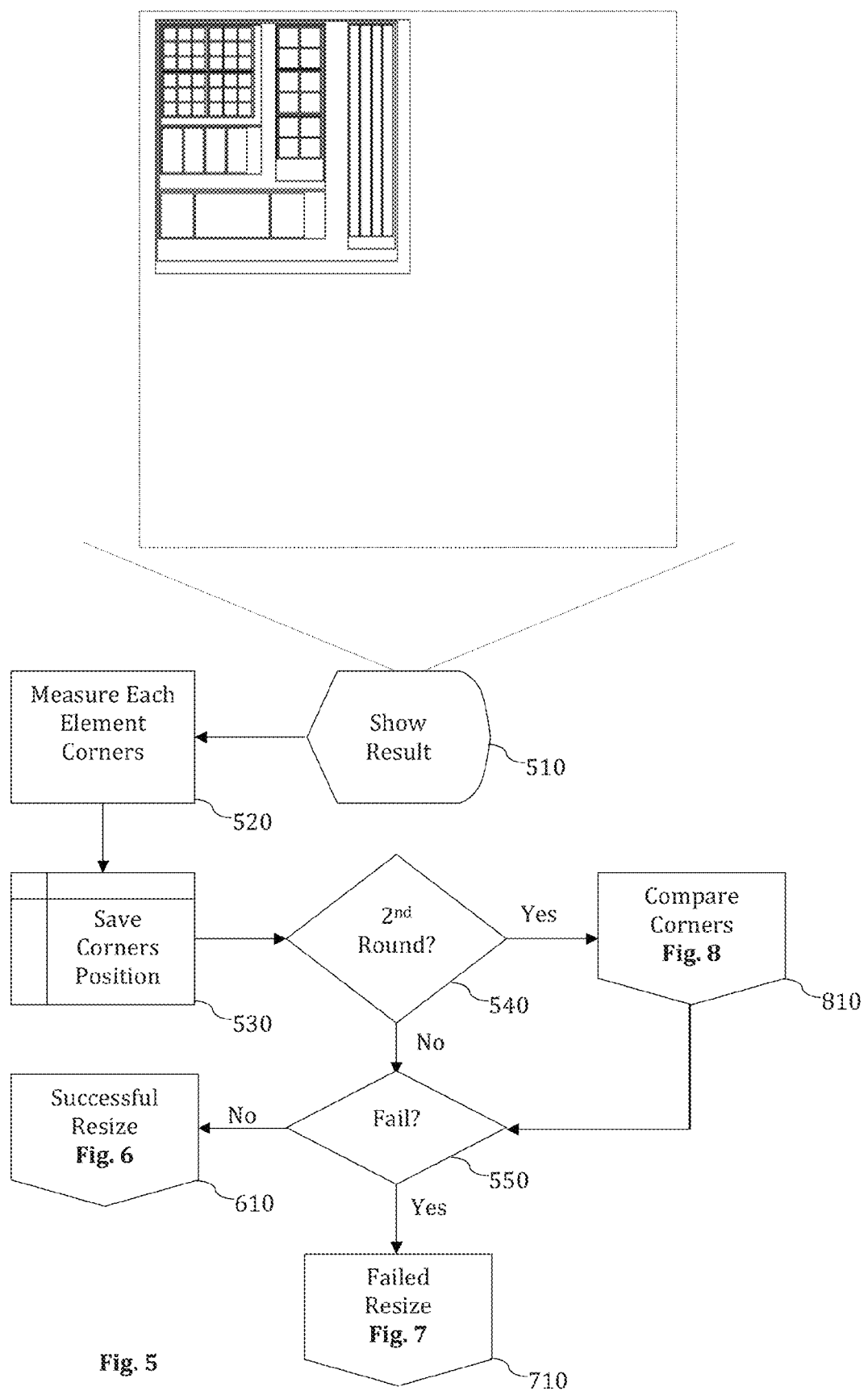
FIG. 5 shows a fourth example of a sub-process that can be used in the process of FIG. 1 in accordance with an embodiment.

FIG. 5 shows a sub-process performed after the resize results are displayed after execution of halve test area height step 510. Then step 520 measures or determines locations of at least two diagonal corners from each element and step 530 stores the data in its internal storage for later reference. After storing the information, a decision is made at step 540 as to how to continue. If this was the first round and a second round is still needed, the application then exits the sub-process and moves forward according to the main process of FIG. 1. If this is the second round, the sub-process continues to step 810, described in more detailed level in FIG. 8, and after that to step 550, where a decision is made whether the resize was successful. Box 610 refers to FIG. 6, which shows an example of a successful resize, whereas box 710 referring to FIG. 7 shows an example of a resize failure. Just to give an example, the displayed primary element width can be 500 pixels and height 500 pixels, for instance.

Figure 6:
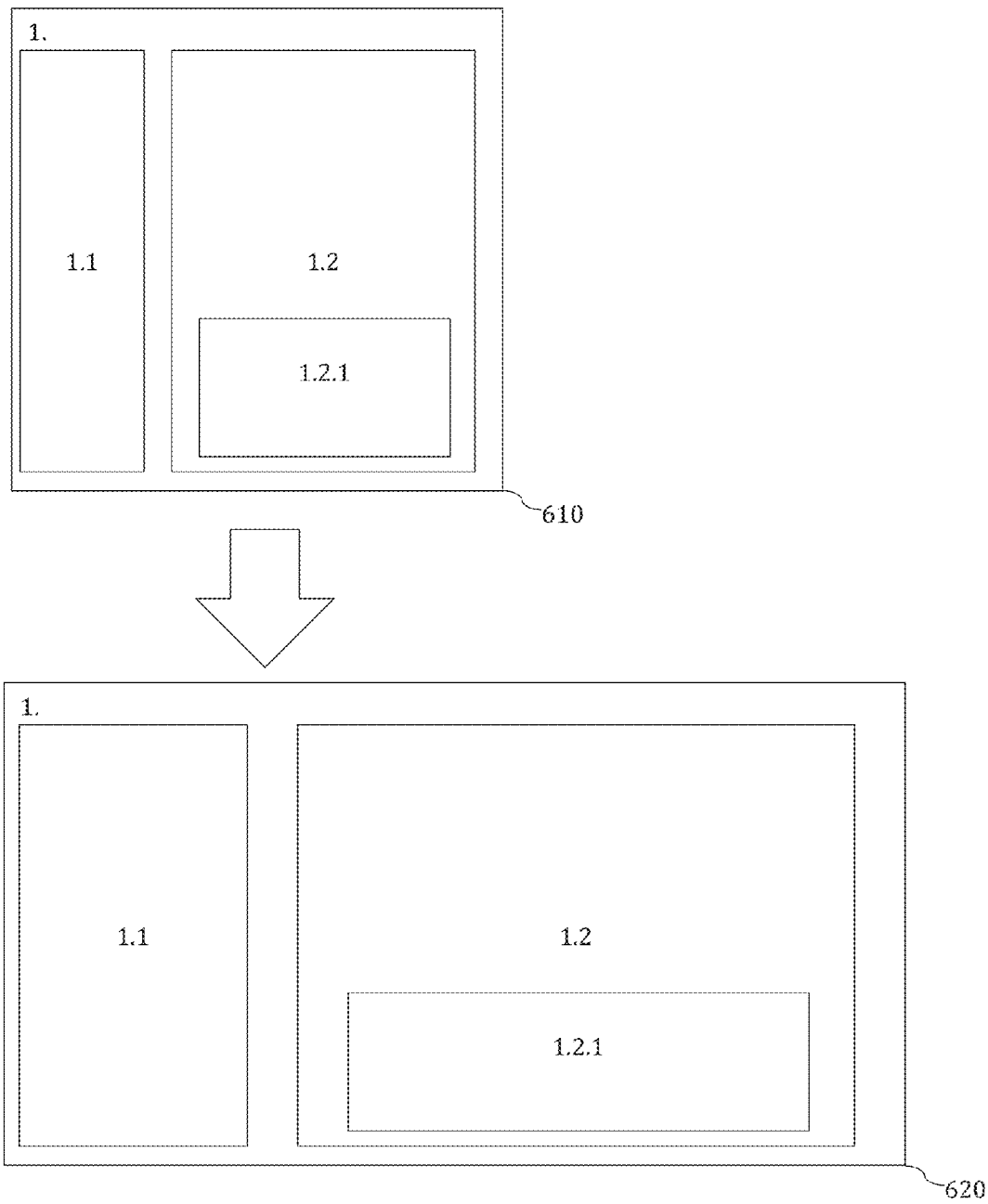
FIG. 6 illustrates an example of a successful resize.
Figure 7:
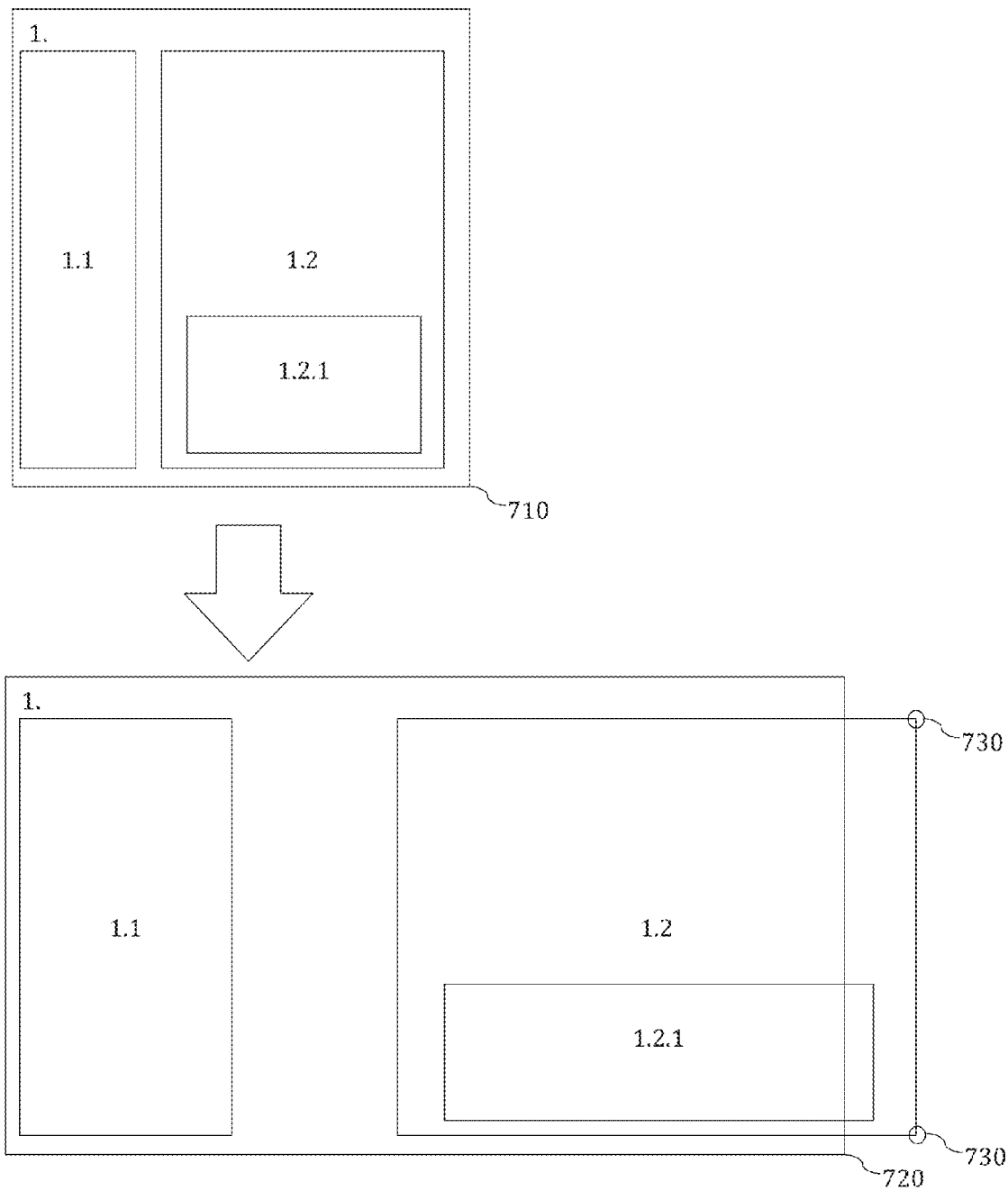
FIG. 7 illustrates an example of main features of detecting resize failures.

FIG. 6 illustrates with a simplified example, how a web browser can perform successful resize. In the simplified example, element number 1 is a parent of elements 1.1 and 1.2, and element 1.2 is a parent of element 1.2.1. After resize, each element stays inside its own parent so resize is successful. Successful resizing can be determined as both 610 and 620 have successfully contained 1, 1.1, 1.2, 1.2.1 inside their correct boundaries.

FIG. 7 illustrates with a simplified example, how a failure on resize is detected and measured. In the simplified example, element number 1 is a parent of elements 1.1 and 1.2, and element 1.2 is a parent of element 1.2.1. After resize, element 1.2 has floated outside its own parent so that at locations 730 two corners of the element failed on resize. Element 1.2.1 however succeeded, because even though the element floated outside its grandparent element 1, the element stayed inside it own (direct) parent element 1.2. Failed resizing can be determined, for example, on the basis that not all of test areas 710 and 720 succeeded to contain all of their elements inside their boundaries. This is because elements 1.2 and 1.2.1 are not within the parent element, as can be seen for example at locations 730.

FIG. 8 shows a flowchart of sub-processes performed during and after the second round of steps 210, 310, 410 and 510 (starting on when phase one is done second time). FIG. 8 sub-process is an accuracy test where web browser resize accuracy is determined by comparing the first round corner positions to the second round corner positions. When corner comparison is necessary, as described in FIG. 2, FIG. 3, FIG. 4 and FIG. 5, step 810 receives the first and second round position information from internal storages 820 and 830. After receiving this information, a decision is made whether the position accuracy test was successful or failure, which states are represented respectively by box 840 and box 850. After determining this, the decision is carried over to the respective one of steps 250, 350, 450 or 550 as described respectively in FIG. 2, FIG. 3, FIG. 4 and FIG. 5. The step 250, 350, 450 or 550 in question renders either a positive or a negative decision and forwards the information to step 610, if positive, and to step 710, if negative. As has been described above, an embodiment of a method of evaluating page resizing capability of a web browser comprises:

creating a web page with a test area, the test area comprising a plurality of test elements;

displaying the web page by the web browser;

for each test element in the displayed web page, determining locations of at least two original edge points of the test element;

resizing the test area within the web page;

displaying the web page with the resized test area;

for each resized test element in the displayed web page, determining locations of at least two respective resize edge points of the test element; and making comparisons between the locations of the at least two original edge points and the locations of the at least two respective resize edge points.

In an embodiment, the test area comprises at least three test elements, and preferably at least 20 test elements.

According to an embodiment, at least one of the test elements has a rectangular shape and the original edge points and the respective resize edge points are formed by at least two diagonal corner points of the respective test element. However, other shapes are also possible whenever supported by the web browser.

According to an embodiment, the method comprises repeatedly performing a sequence of:

resizing the test area within the web page;

displaying the web page with the new resized test area;

for each resized test element in the displayed web page, determining locations of at least two respective new resize edge points of the test element; and saving the determined locations for making comparisons between the locations of the at least two original edge points and the locations of the at least two respective new resize edge points.

According to an embodiment, the sequence is repeated until a predefined number of sequences have been performed. The predefined number can be for example four or more, such as eight or more.

According to an embodiment, the determining of the locations comprises requesting location data relating to the displayed test element from the web browser.

According to an embodiment, at least once the step of resizing comprises applying reverse resize parameters to a resized test area to create a reverse resize test area, the reverse resize parameters being selected so as to produce a test area equal to the originally created test area, the method further comprising checking if the locations of the at least two reverse resize edge points match with the locations of the respective at least two original edge points.

According to an embodiment, the plurality of test elements comprise at least one parent element and at least one child element located inside the respective parent element, the method further comprising checking if the at least one child element is located inside the respective parent element also after resizing of the test area.

According to an embodiment, the plurality of test elements comprise at least one grand-child element located inside the respective child element, the method further comprising checking if the at least one grand-child element is located inside the respective child element also after resizing of the test area.

According to an embodiment, the method comprises repeating said steps of resizing, displaying and determining a number of times such that at least one of the resized test areas is wider than the original test area, at least one of the resized test areas is higher than the original test area, and at least one of the resized test areas is both higher and wider than the original test area.

According to an embodiment, the test area comprises at least two grand-child element inside a common child element.

According to an embodiment, the test area comprises at least two child elements within one parent element.

According to an embodiment, the test area comprises at least twenty test elements.

According to an embodiment, there is provided an application program for evaluating page resizing capability of a web browser.

According to an embodiment, the application program comprises program code means for instructing a user terminal to perform the method according to any one of embodiments described in this specification, or any combination thereof.

According to an embodiment, the application program is made available on a web page.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A method of evaluating page resizing capability of a web browser by means of a computer program, the method comprising the computer implemented steps of:
    creating a web page with a test area, the test area comprising a plurality of test elements;
    displaying the web page by the web browser;
    for each test element in the displayed web page, determining locations of at least two original edge points of the test element;
    resizing the test area within the web page;
    displaying the web page by the web browser with the resized test area;
    for each resized test element in the displayed web page, determining locations of at least two respective resize edge points of the test element;
    generating a test comparing the locations of the at least two original edge points and the locations of the at least two respective resize edge points, and
    wherein the plurality of test elements comprise at least one parent element and at least one child element located entirely inside the respective parent element, the method further comprising checking if the at least one child element is located entirely inside the respective parent element also after resizing of the test area and wherein the test comprises an indication of a successful or failed resize.

2. The method of claim 1, wherein at least one of the test elements has a rectangular shape and the original edge points and the respective resize edge points are formed by at least two diagonal corner points of the respective test element.

3. The method of claim 1, further comprising repeatedly performing a sequence of:
    resizing the test area within the web page;
    displaying the web page with the new resized test area;
    for each resized test element in the displayed web page, determining locations of at least two respective new resize edge points of the test element; and
    saving the determined locations for making comparisons between the locations of the at least two original edge points and the locations of the at least two respective new resize edge points.

4. The method of claim 3, wherein the sequence is repeated until a predetermined number of sequences have been performed.

5. The method of claim 4, wherein the predetermined number is at least four.

6. The method according to claim 1, wherein the determining of the locations comprises requesting location data relating to the displayed test element from the web browser.

7. The method according to claim 1, wherein at least once the step of resizing comprises applying reverse resize parameters to a resized test area to create a reverse resize test area, the reverse resize parameters being selected so as to produce a test area equal to the originally created test area, the method further comprising checking if the locations of the at least two reverse resize edge points match with the locations of the respective at least two original edge points.

8. The method of claim 1, wherein the plurality of test elements comprise at least one grand-child element located inside the respective child element, the method further comprising checking if the at least one grand-child element is located inside the respective child element also after resizing of the test area.

9. The method of claim 8, wherein the test area comprises at least two grand-child element inside a common child element.

10. The method according to claim 1, wherein the test area comprises at least two child elements within one parent element.

11. The method according to claim 1, wherein the test area comprises at least twenty test elements.

12. The method according to claim 1, comprising repeating said steps of resizing, displaying and determining a number of times such that at least one of the resized test areas is wider than the original test area, at least one of the resized test areas is higher than the original test area, and at least one of the resized test areas is both higher and wider than the original test area.

13. An application program product for evaluating page resizing capability of a web browser, the application program product comprising a non-transitory computer readable medium bearing computer program code capable of instructing one or more processors of a user terminal to perform the steps comprising;

creating a web page with a test area, the test area comprising a plurality of test elements;

displaying the web page by the web browser;

for each test element in the displayed web page, determining locations of at least two original edge points of the test element;

resizing the test area within the web page;

displaying the web page by the web browser with the resized test area;

for each resized test element in the displayed web page, determining locations of at least two respective resize edge points of the test element;

generating a test comparing the locations of the at least two original edge points and the locations of the at least two respective resize edge points, and wherein the plurality of test elements comprise at least one parent element and at least one child element located entirely inside the respective parent element, the method further comprising checking if the at least one child element is located entirely inside the respective parent element also after resizing of the test area and wherein the test comprises an indication of a successful or failed resize.

* * * * *